(12) United States Patent
Kajiwara

(10) Patent No.: US 6,922,394 B2
(45) Date of Patent: Jul. 26, 2005

(54) COMMUNICATION APPARATUS WITH SELECTIVE ROUTE OPTIMIZATION CAPABILITIES

(75) Inventor: Yasuhiro Kajiwara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 776 days.

(21) Appl. No.: 09/816,029

(22) Filed: Mar. 22, 2001

(65) Prior Publication Data

US 2002/0015386 A1 Feb. 7, 2002

(30) Foreign Application Priority Data

Aug. 2, 2000 (JP) ........................................ 2000-233897

(51) Int. Cl.[7] .............................................. G01R 31/08
(52) U.S. Cl. ........................ 370/238; 370/248; 370/251
(58) Field of Search ............................. 370/238, 238.1, 370/242, 244, 247, 248, 250, 251, 252, 231, 253, 351, 352, 353, 400

(56) References Cited

U.S. PATENT DOCUMENTS

| | | | | |
|---|---|---|---|---|
| 5,481,604 A | * | 1/1996 | Minot | 379/114.01 |
| 5,754,543 A | * | 5/1998 | Seid | 370/351 |
| 5,956,339 A | * | 9/1999 | Harada et al. | 370/400 |
| 6,044,075 A | * | 3/2000 | Le Boudec et al. | 370/351 |
| 6,654,361 B1 | * | 11/2003 | Dommety et al. | 370/331 |

FOREIGN PATENT DOCUMENTS

| | | |
|---|---|---|
| JP | 10164083 | 6/1998 |
| JP | 10336206 | 12/1998 |

* cited by examiner

Primary Examiner—Phirin Sam
(74) Attorney, Agent, or Firm—Katten Muchin Zavis Rosenman (57) ABSTRACT

A communication apparatus which effectively optimizes the route for each call connection without causing any adverse effect on other existing sessions and thus contributes to better quality and reliability of telecommunications services. A source-side routing data manager collects information necessary for path calculation, evaluates every possible path with the collected information, and manages routing data that is obtained through the path evaluation. A source-side best path finder selects a best path from among those listed in the routing data. A connection releasing unit releases a particular connection when the source-side best path finder has found a new best path that is more suitable for that particular connection than the current path, while maintaining the connectivity of other existing calls. A new best path setting unit performs a call connection procedure by using the newly selected best path, after the connection releasing unit has released the current connection.

9 Claims, 12 Drawing Sheets

T1 ROUTING DATA MANAGEMENT TABLE

| ATM NODE | PORT | ADMINISTRATIVE WEIGHT |
|---|---|---|
| ATM NODE 100 | a1 | 10 |
| | a3 | 30 |
| ATM NODE 101 | b1 | 10 |
| | b2 | 20 |
| ATM NODE 102 | c1 | 20 |
| | c3 | 10 |
| ATM NODE 103 | d1 | 30 |
| | d2 | 10 |

FIG. 6

T2 ROUTING TABLE

| PRIORITY LEVEL | | PATH DESCRIPTION | TOTAL ADMIN. WEIGHT |
|---|---|---|---|
| 1 | R2 | ATM NODE 100 (a1) → ATM NODE 101 (b1→b2) → ATM NODE 102 (c1) | 30 |
| 2 | R3 | ATM NODE 100 (a3) → ATM NODE 103 (d1→d2) → ATM NODE 102 (c3) | 40 |

ROUTING DATA MANAGEMENT TABLE (UPDATED)

T1a

| ATM NODE | PORT | ADMIN. WEIGHT |
|---|---|---|
| ATM NODE 100 | a1 | 10 |
| | a2 | 20 |
| | a3 | 30 |
| ATM NODE 101 | b1 | 10 |
| | b2 | 20 |
| ATM NODE 102 | c1 | 20 |
| | c2 | 20 |
| | c3 | 10 |
| ATM NODE 103 | d1 | 30 |
| | d2 | 10 |

FIG. 9

T2a ROUTING TABLE (UPDATED)

| PRIORITY LEVEL | | PATH DESCRIPTION | TOTAL ADMIN. WEIGHT |
|---|---|---|---|
| 1 | R1 | ATM NODE 100 (a2) → ATM NODE 102 (c2) | 20 |
| 2 | R2 | ATM NODE 100 (a1) → ATM NODE 101 (b1→b2) → ATM NODE 102 (c1) | 30 |
| 3 | R3 | ATM NODE 100 (a3) → ATM NODE 103 (d1→d2) → ATM NODE 102 (c3) | 40 |

COMMUNICATION APPARATUS WITH SELECTIVE ROUTE OPTIMIZATION CAPABILITIES

BACKGROUND OF THE INVENTION

1. Field of the Invention

The present invention relates to a communication apparatus, and particularly to a communication apparatus which finds and uses a suitable path for routing a call connection.

2. Description of the Related Art

Asynchronous Transfer Mode (ATM) is a promising technology for multimedia data communications, which offers a range of transmission rates and different levels of quality of service to efficiently handle various types of I/O traffic over a single network medium, including data, audio, and video information. In many ATM-based enterprise networks, the Private Network-Network Interface (PNNI) protocol is used as the interface specifications for establishing Virtual Channels (VCs) between peer nodes. PNNI is a routing and signaling protocol which applies to a network of ATM nodes, or switches. In recent years, a connection technique known as the Soft Permanent VC (SPVC) has become practical in PNNI networks, by which permanent connections are used to attach end-systems to the network while switched connections are used to interconnect intermediate ATM nodes.

Figure 12:
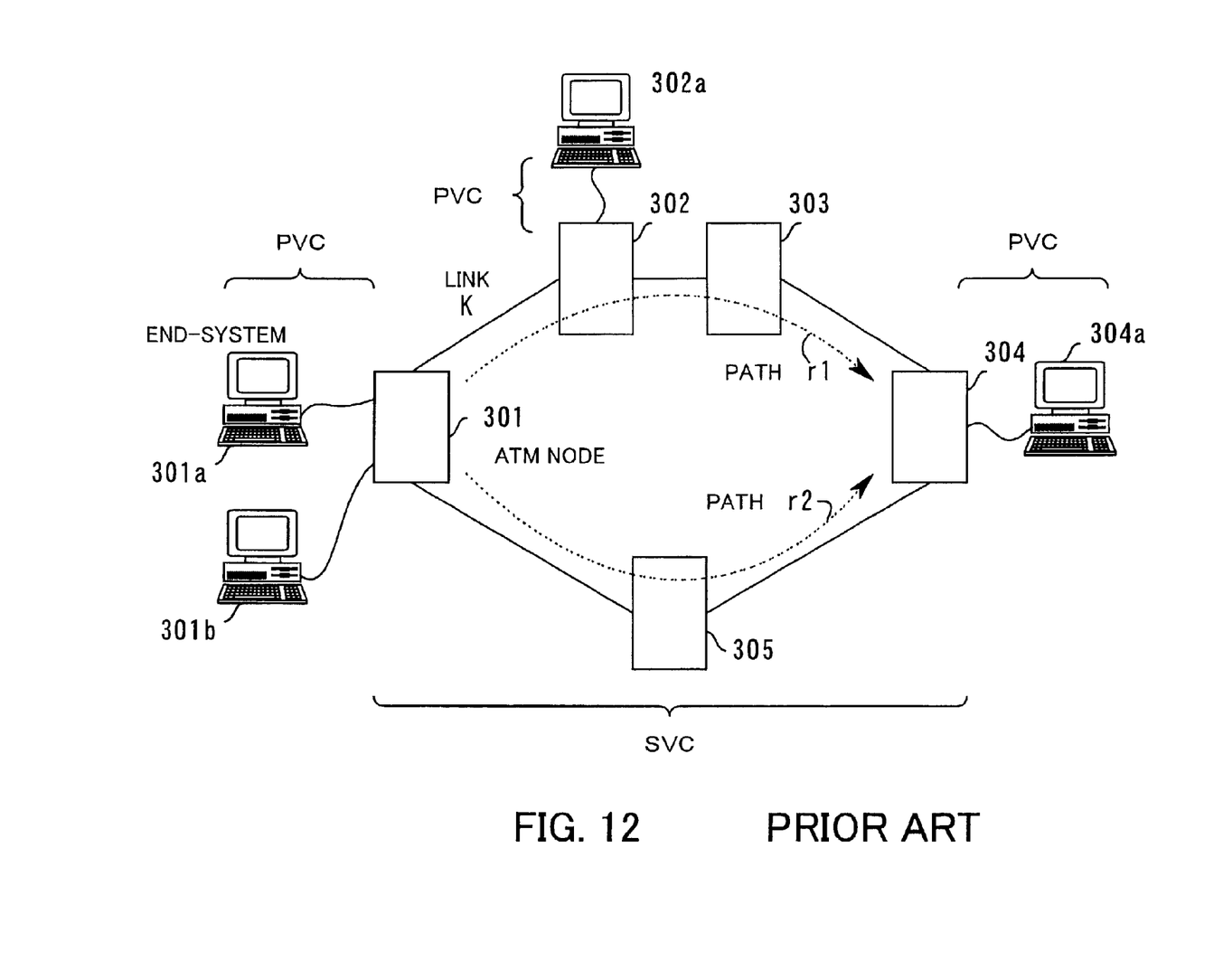
FIG. 12 shows an example of a conventional PNNI network with SPVC support.

FIG. 12 shows an example of a PNNI network that supports SPVC service. In this PNNI network, five ATM nodes 301 to 305 are linked in a ring topology, and two end-systems 301a and 301b are attached to the left-most ATM node 301. Further, two more end-systems 302a and 304a are coupled to other ATM nodes 302 and 304, respectively. With the SPVC service, the end-systems 301a, 301b, 302a, and 304a are linked to their respective local ATM nodes with permanent VCs (PVCs), while network connections among the ATM nodes 301 to 305 will be established with switched VCs (SVCs).

Assume here that one end-system 301b attempts to communicate with a remote end-system 304a, while the ATM node 305 has not yet started up. It is also assumed that there is an ongoing session between the end-systems 301a and 302a over the link K. The calling end-system 301b now tries to set up a connection to the destination end-system 304a. This process starts with a best path selection at the ATM node 301 to which the calling end-system 301a is attached. In the example of FIG. 12, the path r1 is the preferred route at present, since the ATM node 305 has not yet started up. A call setup message is then sent from the source-side ATM node 301 to the destination-side ATM node 304 to establish an SVC connection between those two nodes. When this connection is successfully established, the end-system 301b can communicate with the remote end-system 304a.

The above-described conventional routing mechanism, however, lacks flexibility in adapting to more suitable transit paths that would possibly emerge in the future. In the example of FIG. 12, a new path r2 between the two end-systems 301b and 304a will be formed when the ATM node 305 becomes operable. This new path r2 is better than the current path r1 in terms of the usage of network resources. In an attempt to migrate the route from r1 to r2, the conventional ATM node 301 would block its link K to temporarily close the connections to the neighboring ATM node 302. After unblocking the link K, the ATM node 301 re-executes a routing process, thereby selecting the new best path r2 for the intended connection. The link K, however, has been providing not only the connection to the end-system 304, but also the connection between the end-systems 301a and 302a. The blocking of the link K adversely affects this existing connection, causing a disruption of communication between the two end-systems 301a and 302a.

As seen from the above example, the decision of which route to choose for a particular connection is affected by the growth or scale-down of a network, as well as the failure and recovery of network links and nodes. The conventional routing system has a problem in that the route optimization processing for a certain connection would cause an adverse effect on other existing connections, because of its disruptive blocking and unblocking operations that would reset all links attached to the source-side ATM node.

SUMMARY OF THE INVENTION

Taking the above into consideration, it is an object of the present invention to provide a communication apparatus which optimizes the route of each connection, without disrupting other existing call sessions and thus contributes to better quality and reliability of telecommunication service.

To accomplish the above object, according to the present invention, there is provided a source-side communication apparatus which selects a best path suitable for routing a call. This apparatus comprises the following elements: a source-side routing data manager, a source-side best path finder, a connection releasing unit, and a new best path setting unit. The source-side routing data manager collects information necessary for path calculation, evaluates every possible path with the collected information, and manages routing data that is obtained through the path evaluation. The source-side best path finder finds a best path from among those listed in the routing data. The connection releasing unit releases a particular connection when the source-side best path finder has found a new best path that is more suitable for the particular connection than the path being currently used, while maintaining the connectivity of other existing calls. The new best path setting unit performs a call connection procedure by using the newly selected best path, after the connection releasing unit has released the current connection.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
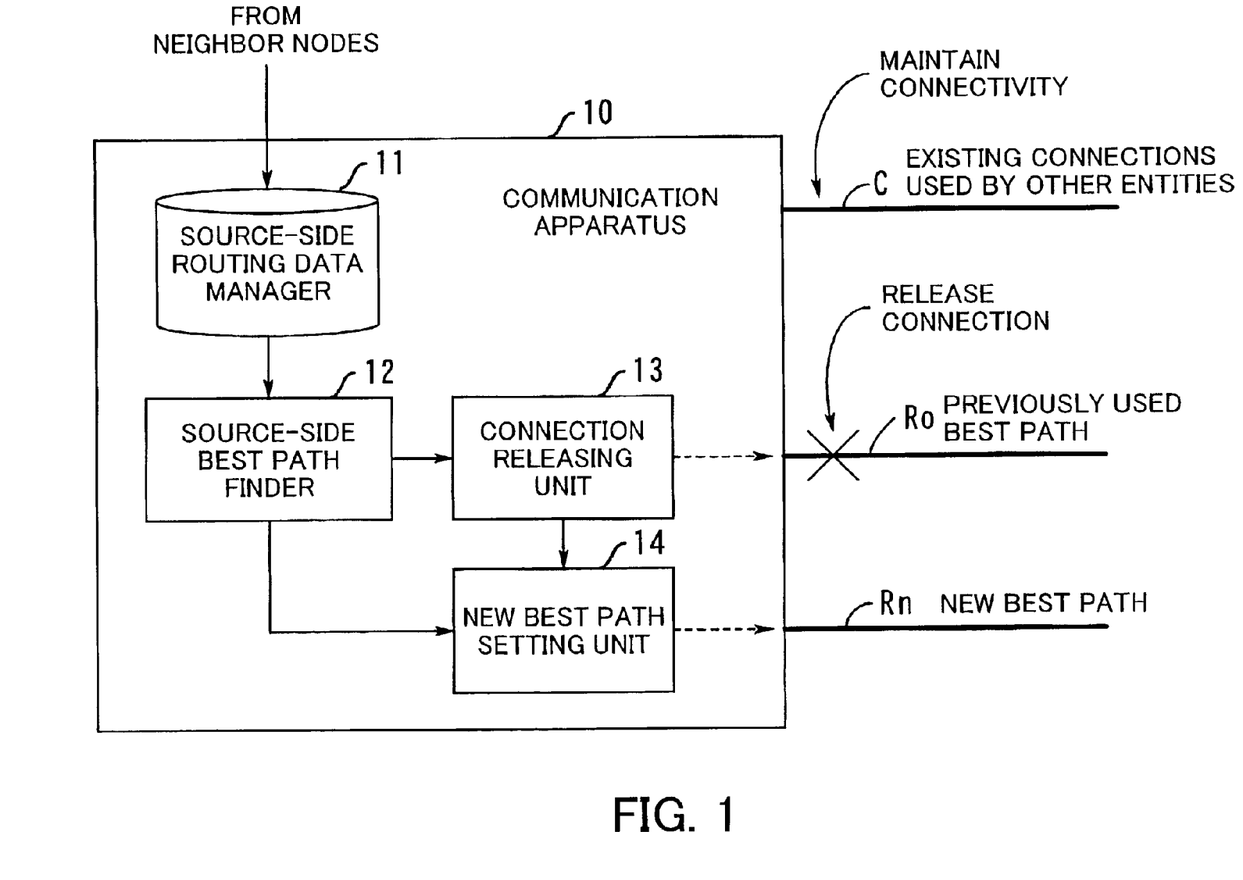
FIG. 1 is a conceptual view of a communication apparatus according to the present invention.

Preferred embodiments of the present invention will be described below with reference to the accompanying drawings. FIG. 1 is a conceptual view of a communication apparatus according to the present invention. This communication apparatus 10 is located at the source side, or the side of a calling party, and selects a suitable path for setting up a network connection to a called party. The proposed apparatus 10 comprises: a source-side routing data manager 11, a source-side best path finder 12, a connection releasing unit 13, and a new best path setting unit 14. The functions of those elements are as follows.

The source-side routing data manager 11 collects information necessary for path calculation, and using the collected information, it evaluates every possible path, and manages the resultant routing data. The source-side best path finder 12 selects the best path from among those listed in the routing data. The connection releasing unit 13 releases a particular connection when the source-side best path finder 12 has found a better path for that connection, while maintaining the connectivity of other existing calls. The new best path setting unit 14 performs a call connection procedure by setting up a connection along the new best path selected by the source-side best path finder 12, after the previous connection is released by the connection releasing unit 13. If there is no other active connections, the best path optimization may be accomplished by re-executing the routing control process from scratch. Otherwise, the communication apparatus 10 selectively switches the current path in question to the new best path, while masking other existing connections.

Suppose, for example, that a path Ro was originally selected as the best path to reach a certain remote end-system, and that the network encountered a change in its conditions that made another path Rn more suitable for that destination end-system. In such a situation, a conventional communication apparatus would block and unblock all the associated connections to reset them. Then it would re-execute a path calculation process and reestablish the connections with the newly selected best paths. As a natural result of that, other ongoing calls over the existing connections C would be disrupted. In contrast to the above conventional apparatus, the proposed apparatus according to the present invention will selectively cancel the current path Ro and then connect a call with the new best path Rn, thus optimizing the connection route without affecting other existing connections C. This feature of the present invention contributes to better quality and reliability of telecommunications services.

Figure 2:
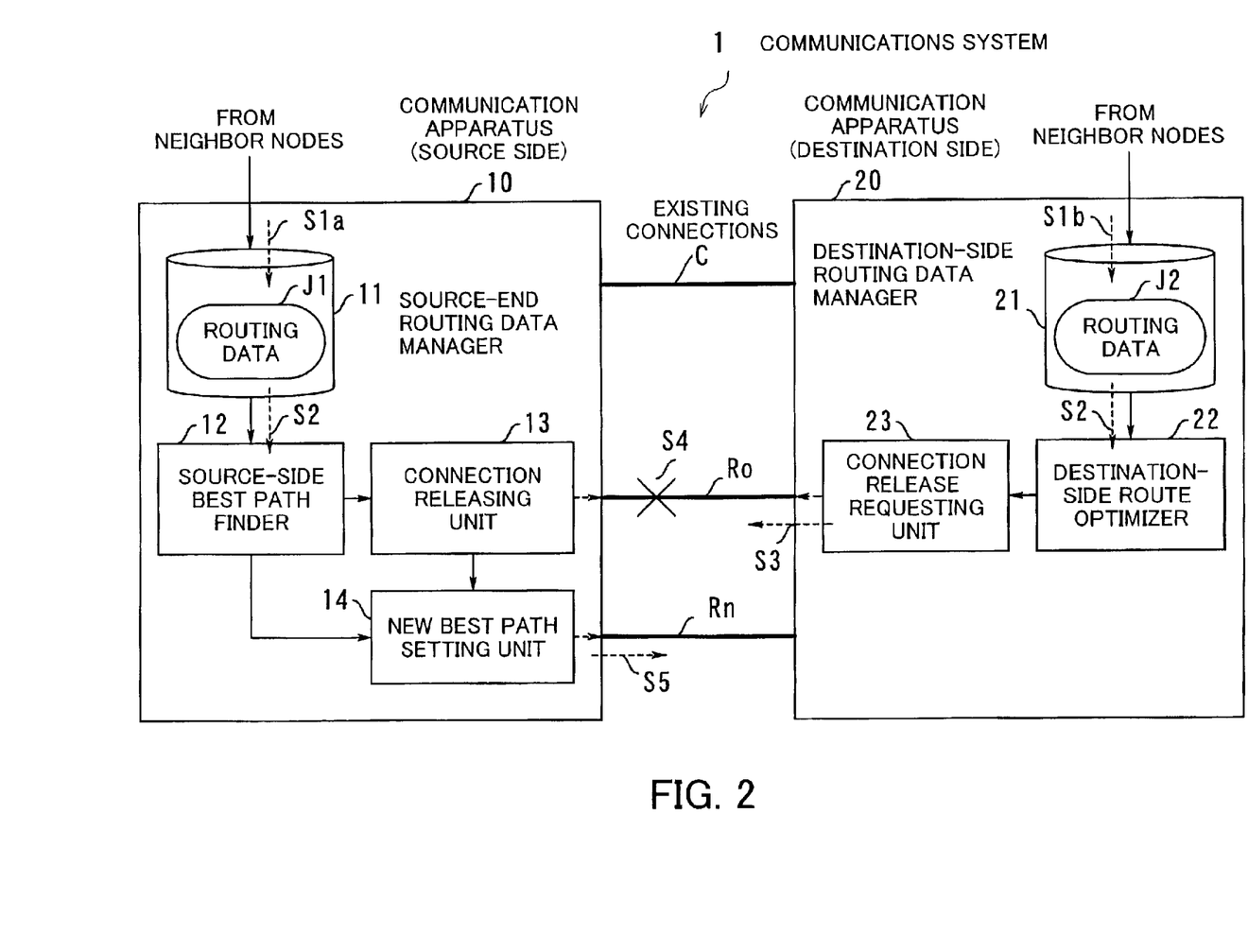
FIG. 2 is a conceptual view of a communications system according to the present invention.

FIG. 2 shows a conceptual view of a communications system according to the present invention. To find and use suitable paths for delivering packets, this communications system 1 comprises a source-side communication apparatus 10 and a destination-side communication apparatus 20 both configured according to the present invention. The structure of the source-side communication apparatus 10 has already been described earlier in FIG. 1. The rounded box J1 shown in FIG. 2 represents the routing data stored in the source-side routing data manager 11.

The destination-side communication apparatus 20 comprises the following elements: a destination-side routing data manager 21, a destination-side best path finder 22, and a connection release requesting unit 23. The destination-side routing data manager 21 collects information necessary for path calculation, and using the collected information, evaluates every possible path, and manages the resultant routing data J2. The destination-side best path finder 22 selects a best path from among those listed in the routing data J2. The connection release requesting unit 23 sends a connection release request regarding a particular connection to the source-side communication apparatus 10 when a better path for that connection is found. This request demands the source-side communication apparatus 10 to selectively release the specified connection while maintaining the connectivity of other existing connections.

Figure 3:
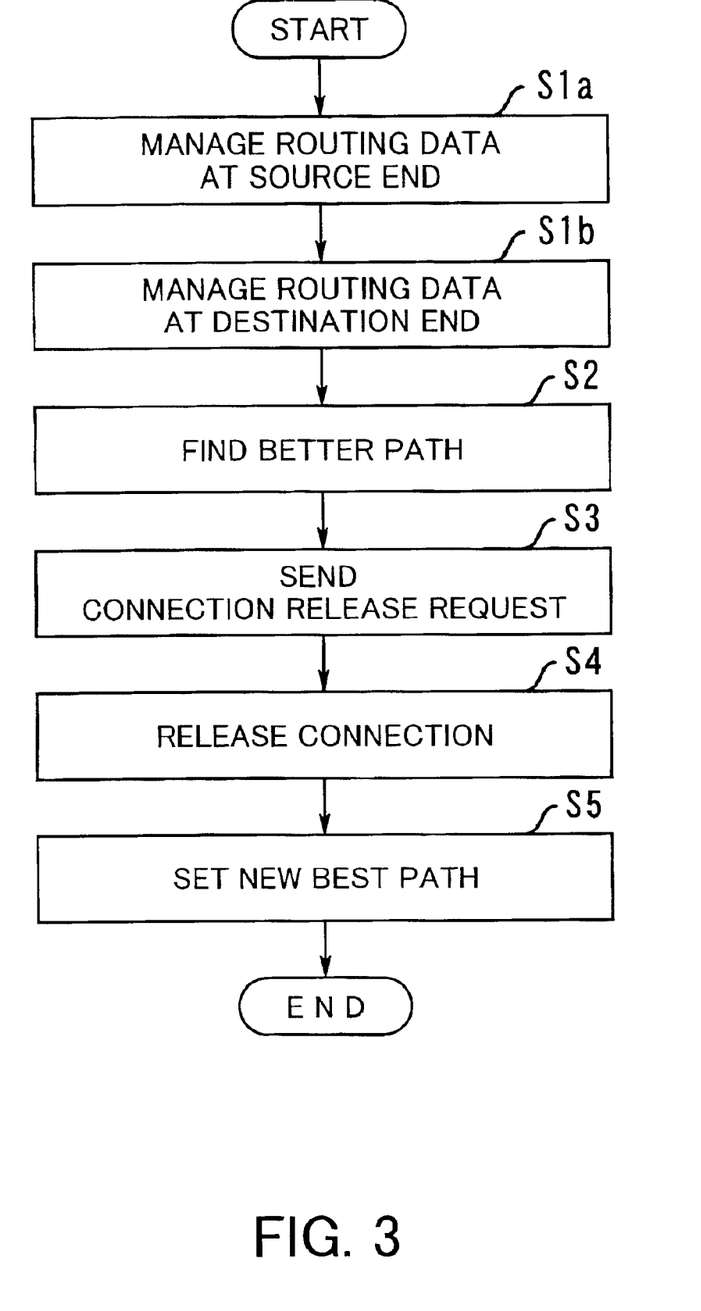
FIG. 3 is a flowchart which shows how the proposed communications system operates.

FIG. 3 is a flowchart which explains how the proposed communications system 1 will operate. More specifically, this flowchart describes a sequence which starts with a connection release request from the destination-side communication apparatus 20 and results in the establishment of a best path connection.

(S1a) The source-side routing data manager 11 collects routing information from its neighbor nodes and evaluates every possible path. The resultant path information is stored as the routing data J1.

(S1b) The destination-side routing data manager 21 collects routing information from its neighbor nodes and evaluates every possible path. The resultant path information is stored as the routing data J2. Although the routing data J1 is actually equivalent to the routing data J2, the two communication apparatus 10 and 20 independently manage their routing data.

(S2) Consulting its local routing data J1, the source-side best path finder 12 seeks the best path reaching the destination-side communication apparatus 20. The destination-side best path finder 22 also finds the best path reaching the source-side communication apparatus 10 by consulting its local routing data J2. This best path detection is also performed independently at the both ends. For illustrative purposes, it is assumed that a change in the network conditions has led the destination-side best path finder 22 to earlier discovery of a new best path Rn.

(S3) Since the destination-side best path finder 22 has found a path Rn that is more suitable than the current path Ro, the connection release requesting unit 23 sends a connection release request to the source-side communication apparatus 10.

(S4) This connection release request is received by the communication apparatus 10. In response to that request, the connection releasing unit 13 temporarily releases the connection over the path Ro while keeping the connectivity of other existing connections C.

(S5) After the release of the connection Ro, the new best path setting unit 14 performs call connection by using the new best path Rn.

As seen from the above sequence, the proposed communications system 1 is designed to maintain the connectivity of other active connections when optimizing the route for a particular connection. This route optimization can be initiated not only at the calling end, but at the called end as well. In the latter case, the destination-side communication apparatus 20 sends a connection release request to the source-side communication apparatus 10. The proposed system 1 performs route optimization effectively, without having any adverse effect on other ongoing communication sessions. The present invention thus contributes to better quality and reliability of telecommunications services.

The next section will now provide the details of the present invention which is applied to an ATM network employing the PNNI protocol. What have been referred to as the "communication apparatus" so far will hereafter be called the "ATM nodes." The detailed description starts with the source-side routing data manager 11 and destination-side routing data manager 21, which are collectively called the "routing data managers."

As previously stated, the role of routing data managers is to collect necessary information for path calculation and evaluate each possible path. More specifically, they first exchange Hello packets at the time of system startup, and after that, they share their topology databases at regular intervals by sending and receiving database summary messages. Hello packet is a type of PNNI routing packet that is exchanged between neighboring ATM nodes, allowing them to know each other's node properties, operational status of a link, and other necessary information. With the Peer Group ID contained in a Hello packet, ATM nodes determine whether to exchange databases with their neighbor node, and they exchange each other's node IDs as required.

Each node has its local database containing information about the structure of other nodes, as well as information about available resources within a PNNI network. This database is used to determine which path to choose for routing a call. Since such databases must be consistent throughout the network, ATM nodes have to share various parameters (e.g., administrative weights, cell transfer delays, cell delay variations). With Database Summary packets, ATM nodes regularly send and receive PNNI Topology State Elements (PTSEs), i.e., a collection of PNNI network topology information, thereby synchronizing their own topology databases with each other.

The next section will describe the connection releasing unit 13 and connection release requesting unit 23.

Figure 4:
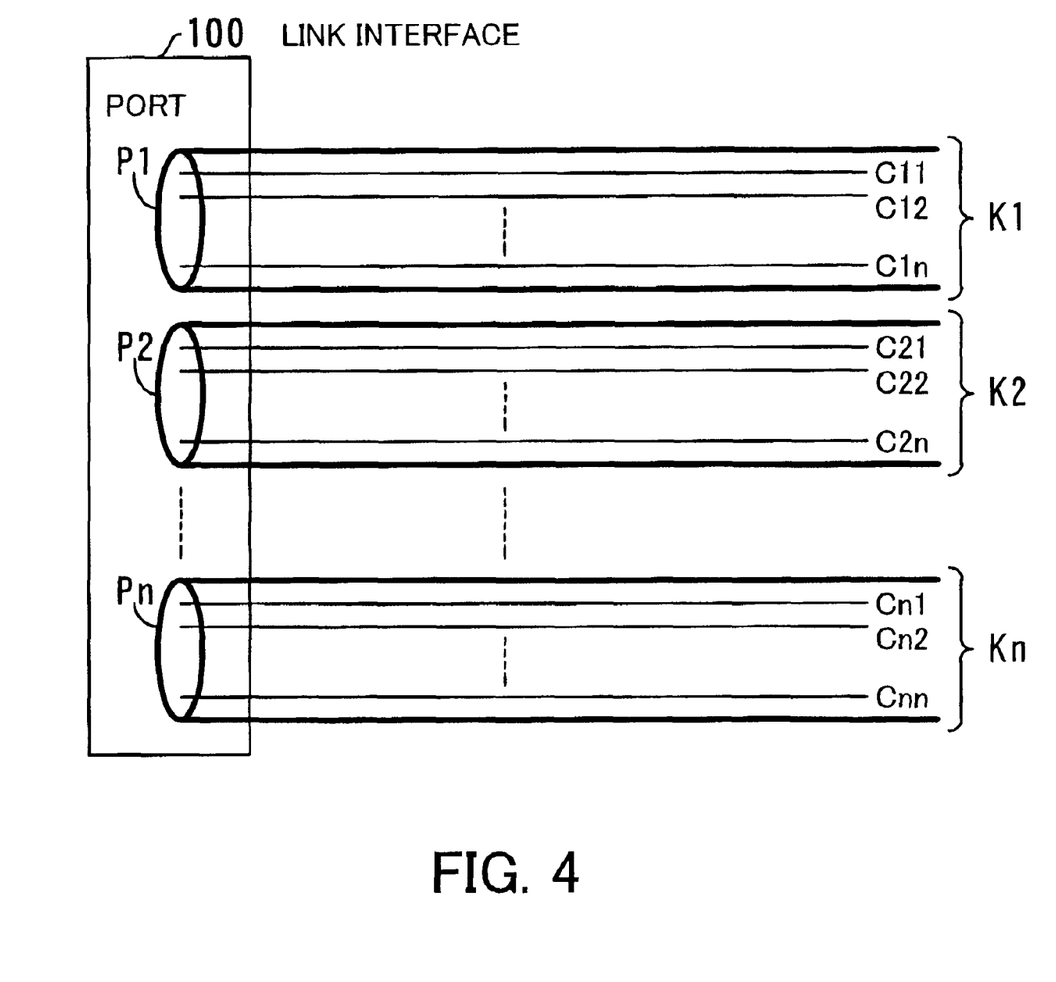
FIG. 4 shows a link interface.

FIG. 4 shows a link interface employed in an ATM node to communicate with its neighbor nodes. This illustrated link interface 100 has a plurality of ports P1 to Pn, which serve as the points of attachment of links K1 to Kn, respectively. Each of those links K1 to Kn accommodates multiple logical connections. More specifically, the upper-most link K1 shown in FIG. 4 contains connections C11 to C1n; the next link K2 contains connections C21 to C2n; the link Kn contains connections Cn1 to Cnn.

According to the present invention, those connections can be released at the source node on an individual connection basis, or on an individual port basis. More specifically, the link interface 100 may selectively release a single connection (e.g., C11) among the plurality of connections C11 to Cnn shown in FIG. 4. In another case, all the existing connections C11 to Cnn may be released at a time, as in the conventional communication apparatus. Further, the link interface 100 may release the connections attached to particular ports, as required. When, for example, the ports P1 and P2 are specified, the connections C11 to C1n, as well as C21 to C2n, will be released simultaneously.

The destination node can initiate the above connection release operations by sending an appropriate connection release request message that specifies which connection(s) or port(s) to release. More specifically, the destination node may request the source node to selectively release a single connection (e.g., C11) among the plurality of connections C11 to Cnn shown in FIG. 4. It can also request the source node to free up all the existing connections C11 to Cnn at a time, or all connections attached to particular ports, as required. Suppose, for example, the ports P1 and P2 are specified, the connections C11 to C1n and C21 to C2n will be released.

As seen from the above, the proposed apparatus adaptively releases connections (or accepts a request therefor) either on an individual connection basis or on an individual port basis, according to the ever-changing network conditions.

The present invention can be applied to a PNNI network supporting Soft PVC (SPVC) services. The following section will discuss the behavior of network nodes, assuming a scenario where a connection is released at the calling end and rerouted to a new best path while masking particular connections.

Figure 5:
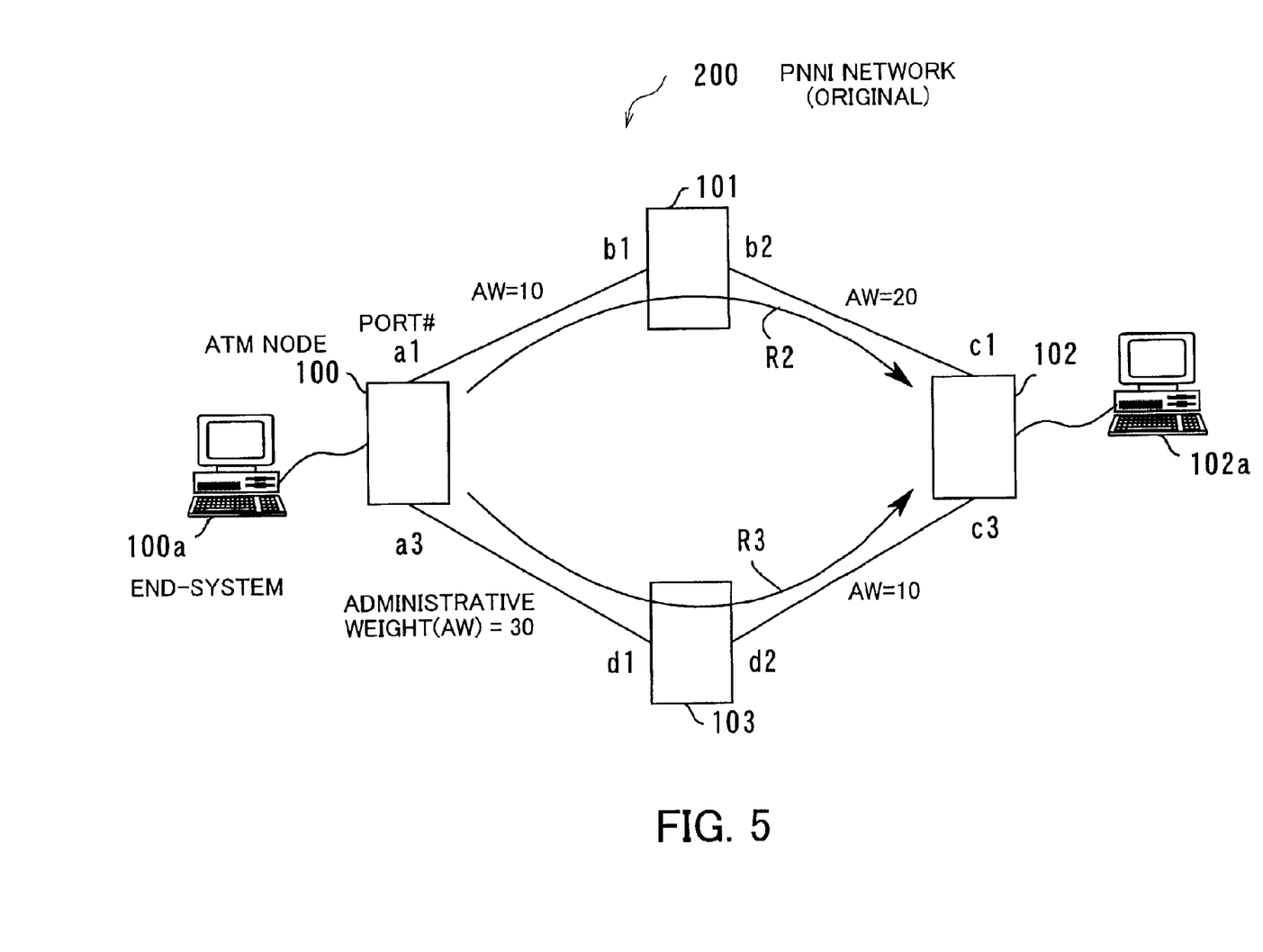
FIG. 5 shows an example of network configuration.
Figure 6:
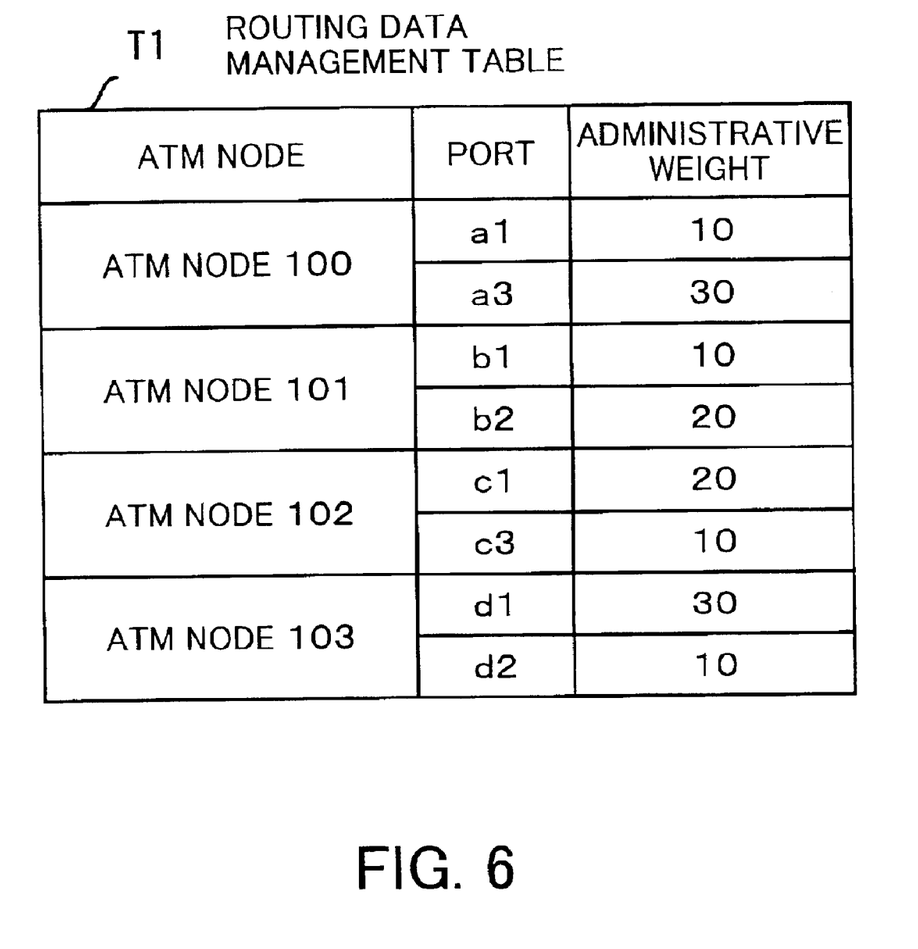
FIG. 6 shows a routing data management table.

FIG. 5 shows an example of a PNNI network with SPVC connections, and FIG. 6 gives a routing data management table for that network. In the illustrated PNNI network 200, four ATM nodes 100 to 103 are linked in a ring topology with SVC connections, and two end-systems 100a and 102a are attached to the ATM nodes 100 and 102, respectively, with PVC connections. Such SPVC service enables the end-systems 100a and 102a to communicate with each other.

The PNNI link interfaces of the ATM nodes 100 to 103 are configured as follows. The ATM node 100 is linked with the ATM nodes 101 and 103 through its ports a1 and a3, respectively. The ATM node 101 is linked with the ATM nodes 100 and 102 through its ports b1 and b2, respectively. The ATM node 102 is linked with the ATM nodes 101 and 103 through its ports c1 and c3, respectively. The ATM node 103 is linked with the ATM nodes 100 and 102 through its ports d1 and d2, respectively.

Referring to FIG. 6, the routing data management table T1 stored in the routing data manager describes how much administrative weight (AW) is assigned to each port (or to the link being attached to each port). The ATM node 100, for example, has an administrative weight of 10 for its port a1, and 30 for port a3.

Figure 7:
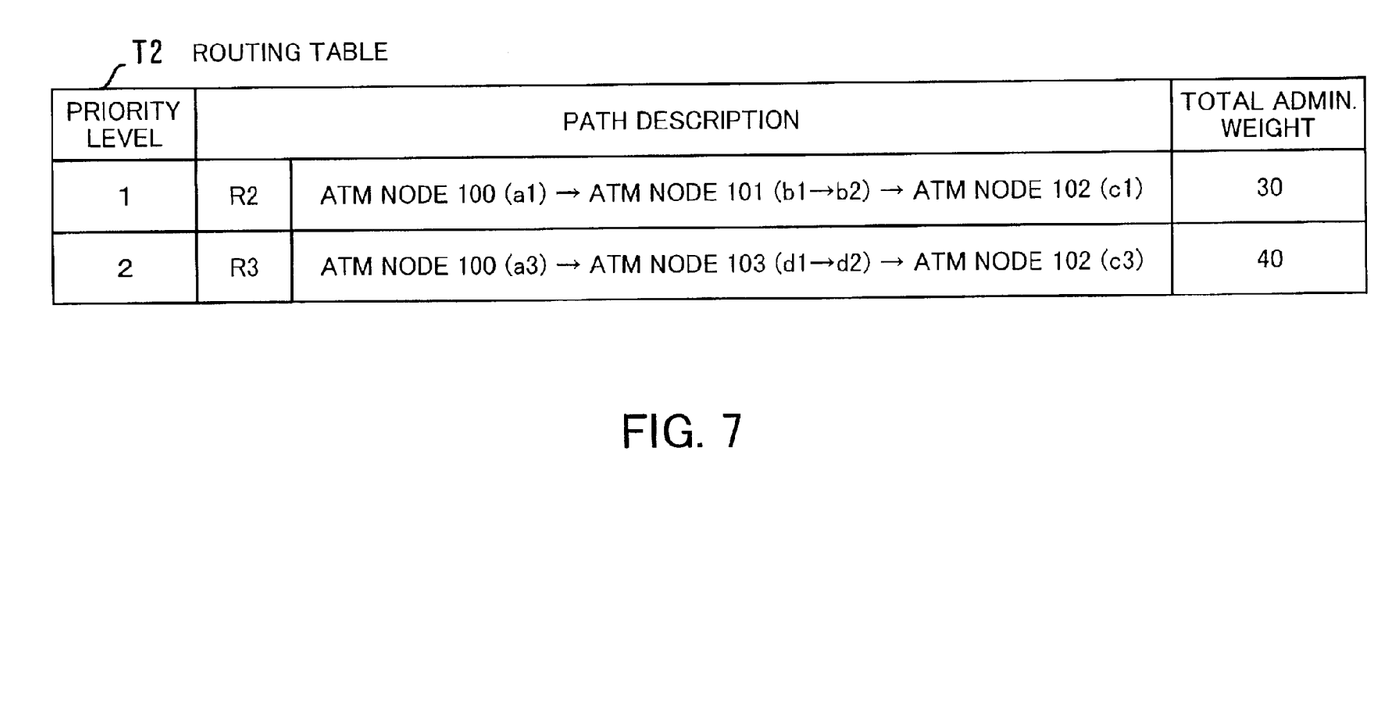
FIG. 7 shows a routing table.

FIG. 7 shows a routing table of the PNNI network 200. This routing table T2 is maintained by the routing data manager. It provides the following data fields: priority level, path description, and total administrative weight. The administrative weight of a path is defined as the sum of the administrative weights of the links contained in the path. As FIG. 5 shows, the end-system 100a can reach its peer end-system 102a via two paths R2 and R3. The total administrative weight of the former path R2 is 30 (=10+20), while that of the latter path R3 is 40 (=30+10). Accordingly, those two paths R2 and R3 on the PNNI network 200 are prioritized in that order (the smaller the better). The above comparison indicates that the path R2 is the best path between the end-systems 100a and 102a. The routing table T2 of FIG. 7 gives a detailed description of this best path R2 as follows: "ATM node 100 (a1)→ATM node 101 (b1→b2)→ATM node 102 (c1)." The PNNI network 200 allows the end-system 100a to communicate with its peer end-system 102a via the path R2.

Suppose here that a direct link between the ATM nodes 100 and ATM node 102 has become available. This change having happened to the original PNNI network 200 results in a new network configuration 201 shown in FIG. 8. FIG. 9 shows the updated routing data management table after that change took place. This routing data management table T1a indicates that two new ports a2 and c2 has been added to the PNNI interface. Starting at the port a2 of the ATM node 100, the new link extends to the port c2 of the ATM node 102. The routing data management table T1a assigns an administrative weight of 20 to each new port a2 and c2.

Figure 10:
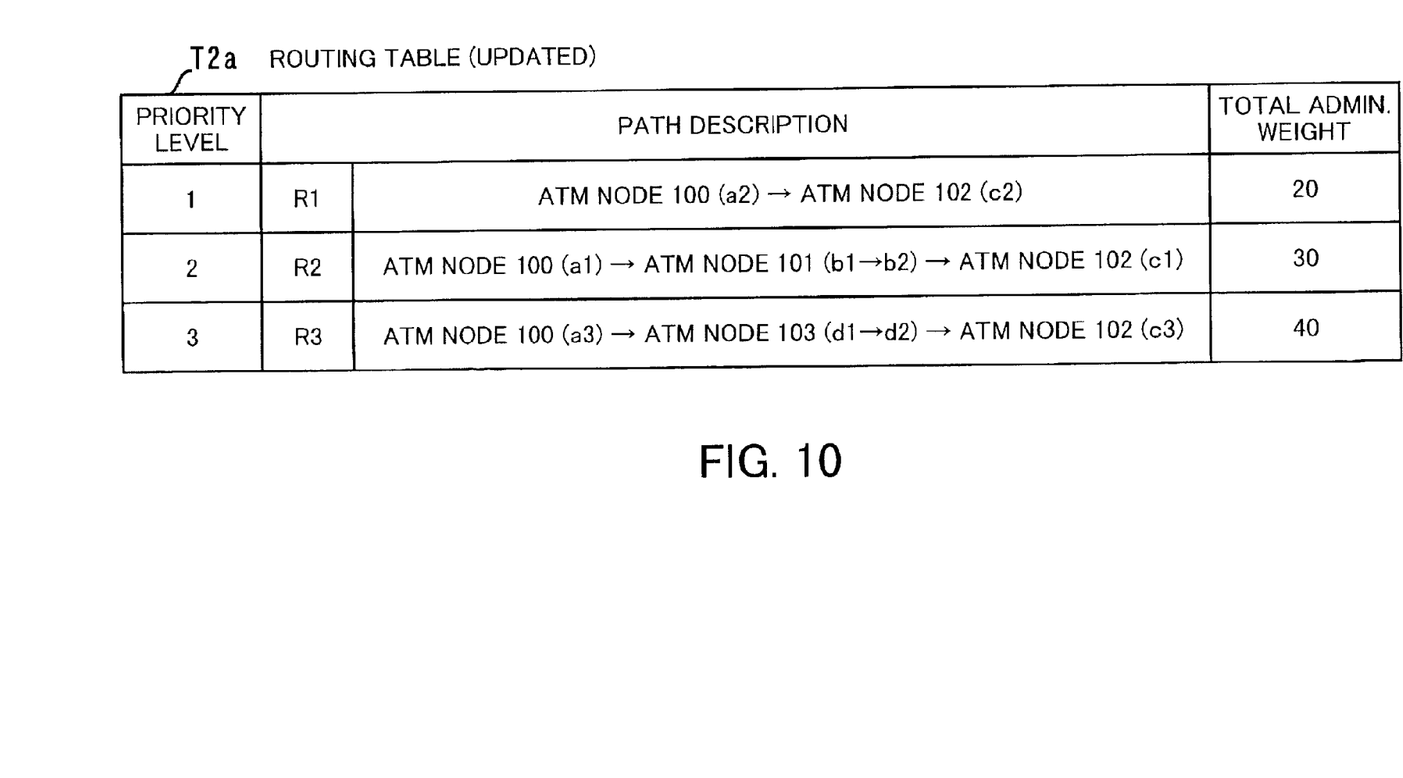
FIG. 10 shows the routing table after the change in the network conditions.

FIG. 10 shows the routing table updated as a result of the change in the PNNI network 200. This routing table T2a reflects the emergence of a new path R1 in the modified PNNI network 201. Because of its total administrative weight 20, the new path R1 is placed in the top rank of priority. This new best path R1 is followed by the second-ranked path R2 (total AW=30) and then by the third-ranked path R3 (total AW=40). The updated routing table T2a describes the new best path R1 as follows: "ATM node 100 (a2)→ATM node 102 (c2)."

In the above-described situation, the source-side best path finder 12 (FIG. 1) scans its local routing table T2a and detects the new best path R1. The connection releasing unit 13 releases the current path R2 accordingly. After that, the new best path setting unit 14 sets up a call connection over the new best path R1, while masking the other paths R2 and R3. This processing allows the end-system 100a to communicate with its peer end-system 102a through the path R1 on the PNNI network 201.

Figure 8:
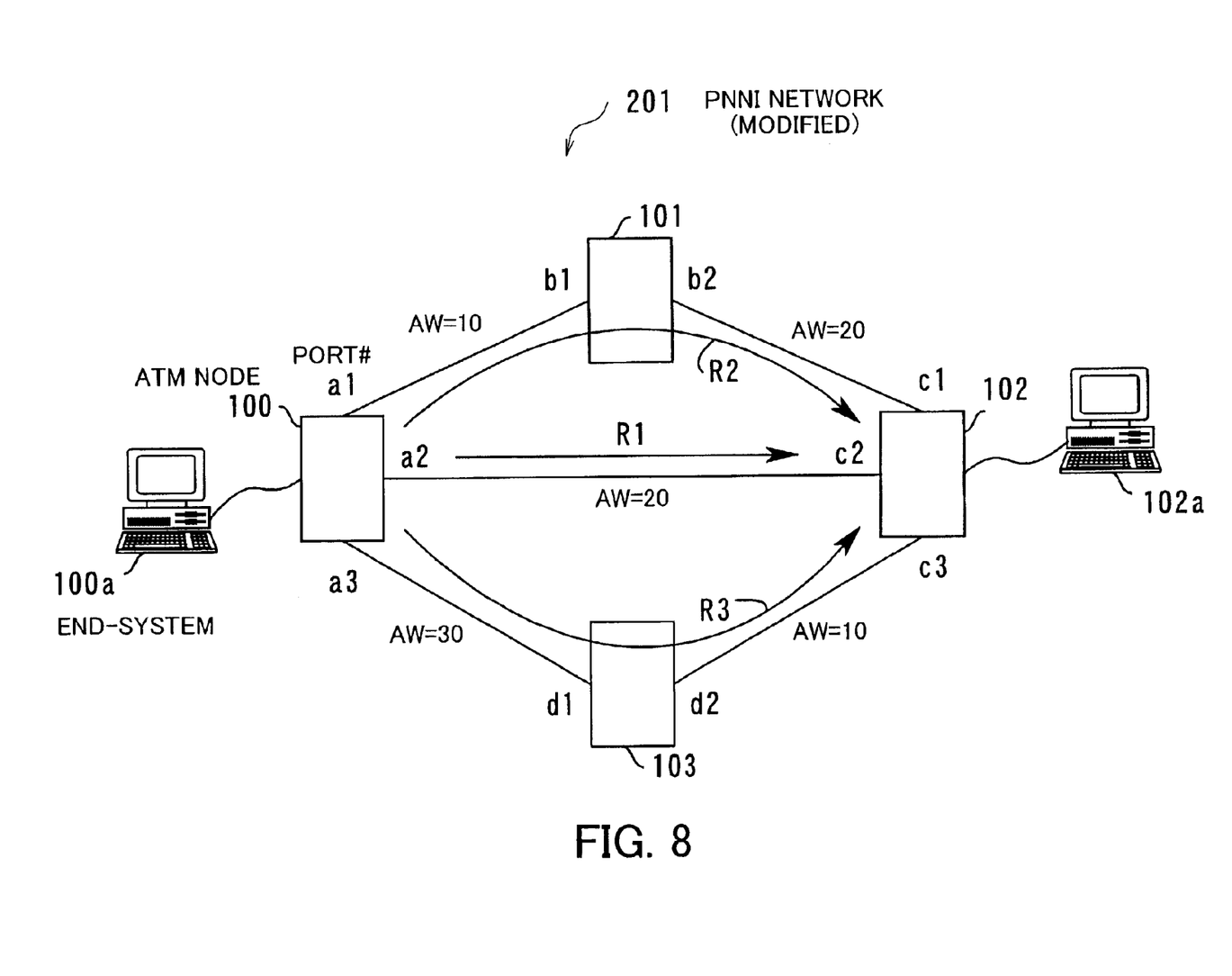
FIG. 8 shows a network configuration after there is a change in the network conditions.
Figure 9:
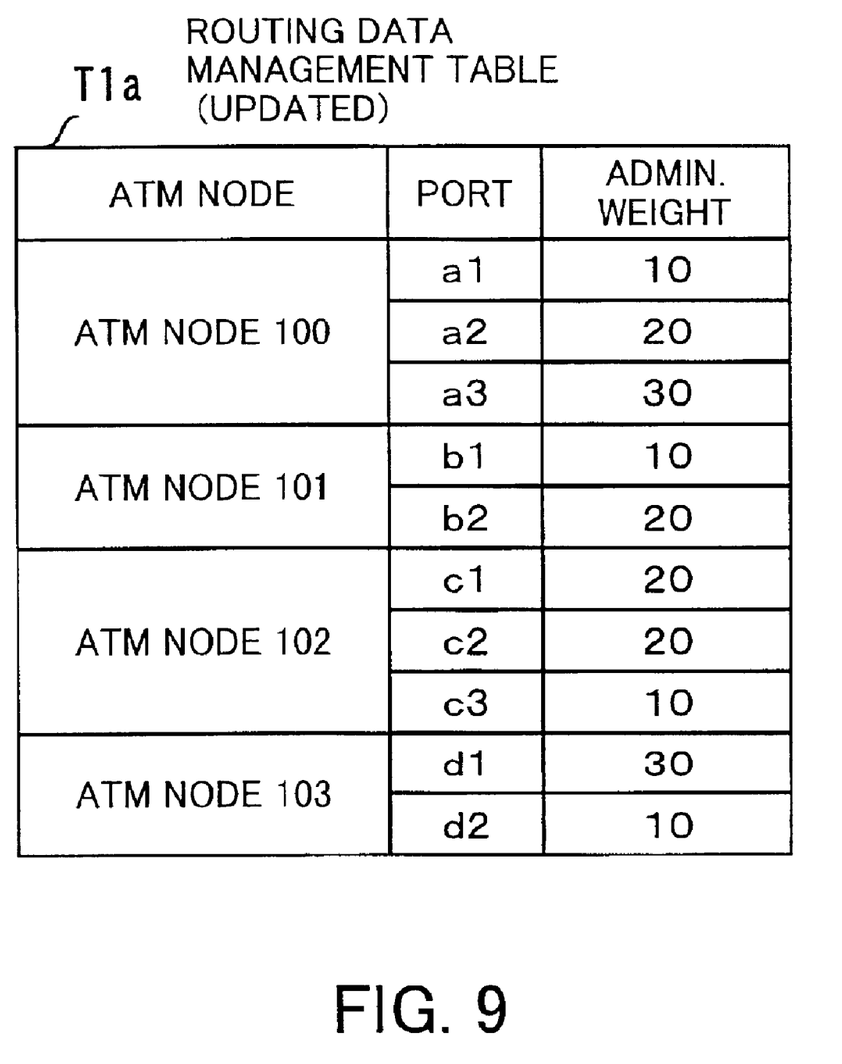
FIG. 9 shows the routing data management table after the change in the network conditions.
Figure 11:
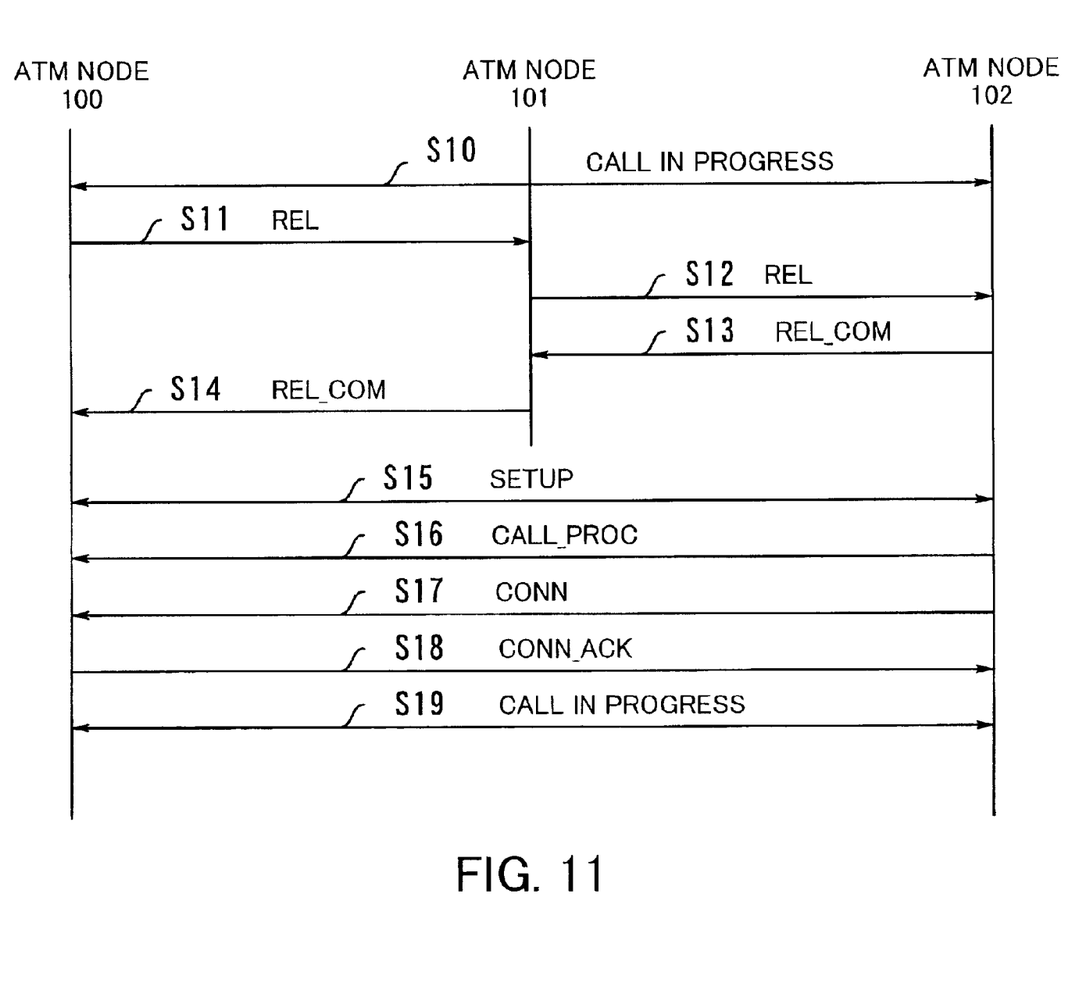
FIG. 11 is a sequence diagram showing a path switchover procedure.

Referring now to FIG. 11, the following section will explain a signaling sequence according to the present invention, assuming the PNNI network 201 of FIG. 8. FIG. 11 is a sequence diagram showing a path switchover procedure, which relocates connections from the current path R2 to a new path R1.

(S10) A call session over the path R2 is available between the end nodes 100 and 102 via the intermediate ATM node 101.

(S11) A new best path R1 has emerged. Then the ATM node 100 sends a RELEASE (REL) message to notify its neighbor ATM node 101 that the connection over the current path R2 should be released.

(S12) The ATM node 101 sends a RELEASE message to its neighbor ATM node 102 for the same purpose.

(S13) The ATM node 102 returns a RELEASE COMPLETE (REL_COM) message back to the ATM node 101 for acknowledgment of the release of the current path R2.

(S14) The ATM node 101 returns a RELEASE COMPLETE message back to the ATM node 100 for the same.

(S15) After releasing the path R2, the ATM node 100 sends a SETUP message to the ATM node 102, routing it on the new path R1.

(S16) Using the same path R1, the ATM node 102 returns a CALL PROCEEDING (CALL_PROC) message back to the ATM node 100 to acknowledge the SETUP message, accepting the use of the new path R1 for connection establishment.

(S17) To establish an end-to-end connection, the ATM node 102 sends a CONNECT (CONN) message to the ATM node 100 over the path R1.

(S18) The ATM node 100 responds to the ATM node 102 with a CONNECT ACKNOWLEDGE (CONN_ACK) message over the path R1 to complete the handshake.

(S19) Now that the connection has been established, the ATM nodes 100 and 102 are able to begin a communication session through the path R1.

The above description will now be summarized as follows. The proposed communication apparatus is designed to maintain the connectivity of other active connections when optimizing the route for a particular connection. For route optimization, a connection release operation can be initiated not only at the source end, but at the destination end as well. The proposed apparatus performs route optimization effectively without having any adverse effect on other communication sessions, thus contributes to better quality and reliability of telecommunications services.

The processes of releasing a connection, sending a connection release request, masking existing connections, and reestablishing a connection over a new best path have been described under the assumption that the connections relevant to those operations are automatically identified by the proposed communication apparatus itself. The present invention, however, should not be limited to this particular configuration. The proposed apparatus may also accept a command from a system operator through a maintenance console coupled thereto. In this case, the system may be configured to notify the operator of the emergence of a new best path by displaying an appropriate message on the monitor screen of the console. The operator then types in a couple of commands to specify which connections to release, and/or which connections to mask.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A source-side communication apparatus which selects a best path suitable for routing a call, comprising:

source-side routing data management means for collecting information necessary for path calculation, evaluating possible paths with the collected information, and managing routing data that is obtained through the path evaluation;

source-side best path finding means for finding a best path from among those listed in the routing data;

connection releasing means, triggered by said source-side best path finding means upon discovery of a new best path that is more suitable for the particular connection than a path that is currently used, for realesing that particular connection while maintaining the connectivity of other existing calls; and new best path setting means for performing a call connection procedure by using the new best path, after said connection releasing means has released the current connection.

2. The communication apparatus according to claim 1, wherein said connection releasing means releases connections on an individual connection basis, or on an individual port basis.

3. The communication apparatus according to claim 1, wherein said new best path setting means sets up a connection over the new best path, while masking particular existing connections.

4. A destination-side communication apparatus which selects a best path suitable for routing a call, comprising:

destination-side routing data management means for collecting information necessary for path calculation, evaluating possible paths with the collected information, and managing routing data that is obtained through the path evaluation;

destination-side best path finding means for finding a best path from among those listed in the routing data;

connection release requesting means, triggered by said destination-side best path finding means upon discovery of a new best path that is more suitable for a particular connection than a path that is currently used, for sending a connection release request for that particular connection while maintaining the connectivity of other existing calls.

5. The communication apparatus according to claim 4, wherein said connection release requesting means requests releasing of connections on an individual connection basis, or on an individual port basis.

6. A communications system which selects a best path suitable for routing a call, comprising:

(a) a source-side communication apparatus comprising:

source-side routing data management means for collecting information necessary for path calculation, evaluating possible paths with the collected information, and managing routing data that is obtained through the path evaluation, source-side best path finding means for finding a best path from among those listed in the routing data, connection releasing means, triggered by said source-side best path finding means upon discovery of a new best path that is more suitable for a particular connection than a path being currently used, for realesing that particular connection while maintaining the connectivity of other existing calls, and new best path setting means for performing a call connection procedure by using the new best path, after said connection releasing means has released the current connection; and (b) a destination-side communication apparatus comprising:

destination-side routing data management means for collecting information necessary for path calculation, and managing routing data that is obtained through the path evaluation, destination-side best path finding means for finding a best path from among those listed in the routing data, and connection release requesting means, triggered by said destination-side best path finding means upon discovery of a new best path that is more suitable for the particular connection than a path that is currently used, for sending a connection release request for that particular connection while maintaining the connectivity of other existing calls.

7. The communications system according to claim 6, wherein said connection releasing means releases connections on an individual connection basis, or on an individual port basis.

8. The communications system according to claim 6, wherein said connection release requesting means requests releasing of connections on an individual connection basis, or on an individual port basis.

9. The communications system according to claim 6, wherein said new best path setting means sets up a connection over the new best path, while masking particular existing connections.

* * * * *